United States Patent [19]
Bottomley

[11] Patent Number: 5,506,861
[45] Date of Patent: Apr. 9, 1996

[54] SYSTEM AND METHOD FOR JOINT DEMODULATION OF CDMA SIGNALS

[75] Inventor: Gregory E. Bottomley, Cary, N.C.

[73] Assignee: Ericsson GE Mobile Comminications Inc., Research Triangle Park, N.C.

[21] Appl. No.: 155,557

[22] Filed: Nov. 22, 1993

[51] Int. Cl.$^6$ .................................................. H04K 1/10
[52] U.S. Cl. .................. 375/200; 375/334; 375/347; 380/34; 370/18; 455/52.1; 455/65
[58] Field of Search .................................... 375/1, 88, 91, 375/96, 100, 101; 380/34, 9; 370/18, 19, 21, 22, 20; 455/52.1, 65

[56] References Cited

U.S. PATENT DOCUMENTS

| | | | |
|---|---|---|---|
| 4,630,283 | 12/1986 | Schiff | 375/1 |
| 5,048,059 | 9/1991 | Dent | 375/94 |
| 5,224,122 | 6/1993 | Bruckert | 375/1 |
| 5,237,586 | 8/1993 | Bottomley | 375/1 |
| 5,305,349 | 4/1994 | Dent | 375/1 |
| 5,347,535 | 9/1994 | Karasawa et al. | 375/1 |

OTHER PUBLICATIONS

"Optimum Multiuser Detection in Single–Path Rayleigh Fading Channels", Zvonar et al., Presented at Twenty–Ninth Allerton Conference on Communication, Control and Computing, pp. 390–399, Oct. 1991.
"On Multiuser Detection in Asynchronous CDMA Flat Rayleigh Fading Channels", Zvonar et al., PIMRC, five pages, 1992.
"A Comparison of Differentially Coherent and Coherent Multiuser Detection With Imperfect Phase Estimates in Rayleigh Fading Channel", Zvonar et al., IT, one page, 1993.
"Adaptive Multiuser Receiver For Fading CDMA Channels With Severe ISI", Zvonar et al., appearing in the Proceedings of Conference on Information Sciences and Systems, six pages, Mar. 1993.
"Joint Signal Detection and Parameter Estimation in Multiuser Communications", Xie, *IEEE Transactions on Communications*, vol. 41, No. 7, pp. 1208–1216, Aug. 1993.
"A Spread–Spectrum Multiaccess System with Cochannel Interference Cancellation for Multipath Fading Channels", Yoon, *IEEE Journal on Selected Areas in Communications*, vol. 11, No. 7, pp. 1067–1075, Sep. 1993.
"On Synchronous CDMA for Mobile Communications", Kajiwara, *IEEE Globecom.*, pp. 858–862, 1992.
"*Optimum Detection in Asynchronous Multiple–Access Multipath Rayleigh Fading Channels*", Zvonar et al., Twenty–Sixth Annual Conference on Info. Sciences and Systems, Princeton Univ., six pages, Mar. 1992.
"*Suboptimum Multiuser Detector for Synchronous CDMA Frequency–Selective Rayleigh Fading Channels*", Zvonar et al., five pages, CTMC, 1992.
"Coherent and Differentially Coherent Multiuser Detectors for Asynchronous CDMA Frequency–Selective Channels", Zvonar et al., *IEEE MILCOM*, pp. 0442–0446, 1992.
"Minimum Probability of Error for Asynchronous Gaussian Multiple–Access Channels", Verdu, *IEEE Transactions on Information Theory*, vol. IT–32, No. 1, pp. 85–96, Jan. 1986.
"Linear Multiuser Detectors for Synchronous Code–Division Multiple–Access Channels", Lupas et al., *IEEE Transactions on Information Theory*, vol. 35, No. 1, pp. 123–136, Jan. 1989.
"Near–Far Resistance of Multiuser Detectors in Asynchronous Channels", Lupas et al., *IEEE Transactions on Communications*, vol. 38, No. 4, pp. 496–508, Apr. 1990.
"A Near–Far Resistant Sliding Window Decorrelating Algorithm for Multi–User Detectors in DS–CDMA Systems", Wijayasuriya et al., *IEEE Globecom.*, pp. 1331–1338, 1992.

(List continued on next page.)

Primary Examiner—David C. Cain
Attorney, Agent, or Firm—Burns, Doane, Swecker & Mathis

[57] ABSTRACT

Methods and systems for jointly demodulating CDMA signals are presented. The disclosed methods and systems provide, among other advantages, for accurate demodulation of such signals in multipath, time-dispersion environments. Single signal or multiple signal demodulation, with or without taking intersymbol interference into account can be accomplished according to the present invention.

23 Claims, 9 Drawing Sheets

OTHER PUBLICATIONS

"Rake Decorrelating Receiver for DS–CDMA Mobile Radio Networks", Wijayasuriya et al., *Electronics Letters,* vol. 29, No. 4, pp. 395–396, Feb. 1993.

"Rake Decorrelation as an Alternative to Rapid Power Control in DS–CDMA Mobile Radio", Wijayasuriya et al., *IEEE,* pp. 368–371, 1993.

"*A Family of Suboptimum Detectors for Coherent Multiuser Communications*", Zie et al., *IEEE Journal on Selcted Areas in Communications,* vol. 8. No. 4, May, 1990.

SYSTEM AND METHOD FOR JOINT DEMODULATION OF CDMA SIGNALS

BACKGROUND

The present invention generally relates to the use of Code Division Multiple Access (CDMA) communications techniques in cellular radio telephone communication systems, and more particularly, to a receiver for jointly demodulating a plurality of CDMA signals with multipath time dispersion.

CDMA or spread spectrum communications has been around since the days of World War II. Early applications were predominantly military oriented. However, today there has been an increasing interest in using spread spectrum systems in commercial applications. Examples include digital cellular radio, land mobile radio, and indoor and outdoor personal communication networks.

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission; equally important is the choice of an effective digital transmission scheme for implementing the next generation cellular technology. Furthermore, it is widely believed that the first generation of Personal Communication Networks (PCNs), employing low cost, pocket-sized, cordless telephones that can be carried comfortably and used to make or receive calls in the home, office, street, car, etc., will be provided by cellular carriers using the next generation digital cellular system infrastructure. An important feature desired in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slob is called a frame. A given signal's energy is confined to one of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse.

With FDMA or TDMA systems or hybrid FDMA/TDMA systems, the goal is to ensure that two potentially interfering signals do not occupy the same frequency at the same time. In contrast, Code Division Multiple Access (CDMA) allows signals to overlap in both time and frequency. Thus, all CDMA signals share the same frequency spectrum and in the frequency or time domain, the CDMA signals appear to overlap one another.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every cell. CDMA transmission of voice by a high bit rate decoder ensures superior, realistic voice quality. CDMA also provides for variable data rates allowing many different grades of voice quality to be offered. The scrambled signal format of CDMA eliminates cross talk and makes it very difficult and costly to eavesdrop or track calls, ensuring greater privacy for callers and greater immunity from air time fraud.

In a CDMA system, each signal is transmitted using spread spectrum techniques. In principle, the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate two carriers at the same frequency, but ninety degrees different in phase.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit is called a "chip". The entire N-chip sequence, or its complement, is referred to as a transmitted symbol. The traditional receiver correlates the received signal with the complex conjugate of the known signature sequence to produce a correlation value. Only the real part of the correlation value is computed. When a large positive correlation results, a "0" is detected; when a large negative correlation results, a "1" is detected.

The "information bits" referred to above can also be coded bits, where the code used is a block or convolutional code. Also, the signature sequence can be much longer than a single transmitted symbol, in which case a subsequence of the signature sequence is used to spread the information bit.

In many radio communication systems, the received signal includes two components: an I (in-phase) component and a Q (quadrature) component. This occurs because the transmitted signal has two components (e.g. QPSK), and/or the intervening channel or lack of coherent carrier reference causes the transmitted signal to be divided into I and Q components. In a typical receiver using digital signal processing, the received I and Q component signals are sampled and stored at least every $T_c$ seconds, where $T_c$ is the duration of a chip.

In mobile communication systems, signals transmitted between two locations typically suffer from echo distortion or multipath rime dispersion, caused by, for example, signal reflections from large buildings or nearby mountain ranges. Multipath dispersion occurs when a signal proceeds to the receiver along not one but many paths so that the receiver receives many echoes having different and randomly varying delays and amplitudes. Thus, when multipath rime dispersion is present in a CDMA system, the receiver receives a composite signal of multiple versions of the transmitted symbol that have propagated along different paths (referred to as "rays") having relative time delays of less than one symbol period. Each distinguishable "ray" has a certain relative time of arrival m $T_c$ seconds and spans N of the I and Q chip samples, since each signal image is an N-chip sequence. It is typical to let m=0 correspond to the arrival of the earliest signal ray. Also, each ray has a certain amplitude and phase, which is represented by a complex channel coefficient c(m).

As a result of multipath time dispersion, the correlator outputs several smaller spikes rather than one large spike. To detect the transmitted symbol (and recover the information bit), the spikes received are combined. Typically, this is done by a RAKE receiver, which is so named because it "rakes" all the multipath contributions together.

A typical form of the RAKE receiver is shown in FIG. 1. A received radio signal is demodulated, for example, by mixing it with cosine and sine waveforms and filtering the signal in an RF receiver 100. Also, the resulting I and Q signals are sampled and quantized, yielding I and Q chip samples, which can be viewed as complex samples whose real part is the I sample and whose imaginary part is the Q sample. These complex samples are passed serially through a correlator 101, which correlates the complex received samples to the conjugate of the known signature sequence, producing a series of complex correlations.

A gating function 103 determines which correlation values are to be used for detection. The gating function 103 passes correlation values to a half complex multiplier (HCM) 104 at such times as are determined by the timing control unit 102. At those times, which occur once per ray per transmitted symbol, the gating function 103 passes a correlation value to the half complex multiplier 104, which multiplies the complex correlation with the appropriate RAKE tap coefficient, computing only the real part of the product. The RAKE tap coefficients are the conjugates of channel tap estimates provided by the channel tracking unit 105, which uses correlation values from the correlator 101 to estimate the channel tap locations (m values) and coefficients (c(m) values). Accumulator 106 accumulates the outputs of the HCM 104 and sends the final sum, once per transmitted symbol, to a threshold device 107. The threshold device 107 detects a binary "0" if the input is greater than a threshold, or a binary "1" if the input is less than the threshold. The threshold is typically zero.

The detailed operation of a conventional correlator 101 is shown in FIG. 2. The complex chip samples from the RF receiver are sent to an internal tapped delay line 200. There is also a tapped buffer 201, which stores the known signature sequence or its complex conjugate. For each chip sample that is fed into the tapped delay line 200, a correlation is performed with the conjugate of the signature sequence. Complex multipliers 202 multiply received samples with conjugated signature sequence values. The resulting complex products are summed in the complex summer 203. The resulting correlation value is sent to the gating function 103 as shown in FIG. 1.

The conventional RAKE receiver gives good performance provided several conditions are satisfied. The first condition is that the autocorrelation function of the signature sequence is ideal, in that the signature sequence is uncorrelated with a shift of itself. If this is not true, then the different signal rays interfere with one another, which is referred to as self interference. The second condition is that the crosscorrelation between the signature sequence of the desired signal and various shifted versions of the signature sequences of the other CDMA signals is zero. If this is not true, then the other CDMA signals interfere with the desired CDMA signal, degrading performance. This can be a particularly bad problem when another CDMA signal has a much higher power than the desired CDMA signal, referred to as the near-far problem. The third condition is that the interference caused by an echo of one transmitted symbol overlapping with the next transmitted symbol be negligible. If this is not true, then transmitted symbols interfere with past and future transmitted symbols, which is commonly referred to as intersymbol interference (ISI).

The theory of the design of good signature sequence sets indicates that there are fundamental limitations which prevent the first two conditions from being satisfied simultaneously. Consequently, performance will be limited by self interference, other signal interference, and ISI. There has been work to address the problem of other signal interference in an environment that does not experience multipath time dispersion. This is referred to as joint demodulation with no multipath. Note, for example, S. Verdù, "Minimum Probability of Error For Asynchronous Gaussian Multiple-Access Channels," IEEE Trans. Info. Theory, Vol. IT-32, pp. 85–96, R. Lupas and S. Verdù, "Linear multiuser detectors for synchronous code-division multiple-access channels," IEEE Trans. Inform. Theory, Vol. 35, pp. 123–136, Jan. 1989; and R. Lupas and S. Verdù, "Near-far resistance of multiuser detectors in asynchronous channels," IEEE Trans. Commun., Vol. 38, pp. 496–508, Apr. 1990. In these works, two approaches for jointly demodulating multiple CDMA signals are presented.

The first approach, known as Maximum Likelihood Sequence Estimation (without multipath), determines the most likely set of transmitted information bits for a plurality of CDMA signals without multipath time dispersion. This is illustrated in FIG. 3. As in the RAKE receiver, an RF receiver 300 receives a plurality of CDMA radio signals which are filtered and mixed down to I and Q baseband waveforms, which are sampled and quantized yielding complex received data values. These are sent to a plurality of correlators 301, each of which correlates to a particular signature sequence. However, because the channel is assumed not to have multipath time dispersion, only one correlation is kept per transmitted symbol. The one selected for use in demodulation is determined by the timing control unit 302, which signals the gating functions 303 to pass a value once per transmitted symbol period. Because the different CDMA signals may not be time aligned, i.e. asynchronous, the gates do not necessarily close at the same time. The correlation values are passed to a decision algorithm unit 304, which uses this information to decide the transmitted bit sequences of each CDMA channel. The algorithm used is the Viterbi algorithm, which determines the most likely information bit sequences. Note, however, that this receiver does not allow for a plurality of signal rays, i.e., by only passing one correlation value per transmitted symbol period from the gating function, and does not track channel coefficients.

The second approach, known as the decorrelation receiver, decorrelates the different CDMA signals so that they no longer interfere with one another. The method follows the same approach shown in FIG. 3. The only difference between these first and second approaches is the decision algorithm used, which is illustrated in FIG. 4. Correlation values from the gating functions, block 303 in FIG. 3, are stored in a buffer 400. When the buffer is full, the set of correlation values are viewed as a vector of values. This vector is multiplied by a decorrelation matrix in the matrix multiplier 401. The matrix used for the multiplication consists of signature sequence crosscorrelation values. The product of the matrix and the vector is a vector of decorrelated detection statistics, one for each CDMA signal, which are fed to thresholding devices 402. These produce the detected information bit values.

Both of these approaches do not address the problem of multipath time dispersion. Thus, they give approaches for the joint demodulation of CDMA signals in the absence of multipath time dispersion.

Recently, Wijayasuriya and others have proposed a form of the decorrelation receiver intended for multipath time dispersion. See S. S. H. Wijayasuriya, G. H. Norton, and J. P. McGeehan, "A near-far resistant sliding window decorrelating algorithm for multi-user detectors in DSCDMA systems," Proc. Globecom '92, Orlando, Fla., pp. 1331–1338, Dec. 1992, S. S. H. Wijayasuriya, J. P. McGeehan, and G. H. Norton, "Rake decorrelating receiver for DS-CDMA mobile radio networks," Electronics Letters, vol. 29, no. 4, pp. 395–396, 18 Feb. 1993, and S. S. H. Wijayasuriya, J. P. McGeeban, and G. H. Norton, "RAKE decorrelation as an alternative to rapid power control in DS-CDMA mobile radio," 43rd IEEE Vehicular Technology Conference, Secaucus, N.J., pp. 368–371, May 18–20, 1993. In these papers, decorrelation is applied to decorrelate multiple rays of each signal. However, these rays are combined noncoherently. Thus, there is no channel estimation and performance is limited to that of noncoherent methods.

Also, Zvonar and Brady have proposed both an MLSE and a decorrelation receiver for joint demodulation in multipath. For the MLSE receiver, see Z. Zvonar and D. Brady, "Optimum detection in asynchronous multiple-access multipath Rayleigh fading," Twenty-sixth Annual Conf. on Information Sciences and Systems, Princeton, University, March 1992. In this receiver, correlations with the full signature sequence are made at the different ray arrival times. These correlations are RAKE combined to give a combined signal for each user, which are then passed to a decision algorithm. This has the disadvantage in that the combined signals depend on future as well as past transmitted symbols, which increases the complexity of the decision algorithm.

For the decorrelation receiver, see Z. Zvonar and D. Brady, "Coherent and differentially coherent multiuser detectors for asynchronous CDMA frequency-selective channels," Milcom '92, San Diego, Calif., Oct. 11–14, 1992, and Z. Zvonar and D. Brady, "Suboptimum multiuser detector for synchronous CDMA frequency-selective Rayleigh fading channels," Communication Theory Mini-Conference, Orlando, Fla., Dec. 6–9, 1992. In the first article, the decorrelation is implemented assuming an "infinite-horizon" detector, which leads to a matrix FIR filter, followed by a bank of IIR filters. This implementation has two disadvantages: 1) the filtering is noncausal, so that future data values are required, and 2) the effort required to determine the filter coefficients can be substantial, as a matrix inverse is required. In the second article only synchronous signals are considered, intersymbol interference is ignored, and decorrelation is performed as a matrix inverse. This has the disadvantage of not addressing asynchronous signals and not addressing intersymbol interference. Also, the matrix inversion may be quite costly, especially when the channel changes with time. Finally, both of these articles do not separate the channel effects (which may be time varying) from the signature sequence correlation effects (which change when signals are stopped or new signals are started).

Thus, the growing demand for radio communications raises the need to optimize the performance and capacity of wireless communications systems. CDMA technology can give high system capacity. To maximize CDMA capacity in a mobile radio environment, other signal interference, self interference, and ISI must be minimized in an efficient manner. Existing approaches fail to address all of these problems.

SUMMARY

An objective of the present invention is the demodulation of a plurality of CDMA signals in a multipath time dispersion environment in an efficient manner. A first exemplary embodiment of the present invention, referred to as MLSE joint demodulation in multipath, determines the most likely transmitted bit sequences based on receiving a plurality of CDMA signals and echoes of said signals. A second exemplary embodiment, referred to as decorrelation demodulation in multipath, decorrelates a plurality of CDMA signal rays to determine the transmitted bit sequence. A third, referred to as pseudo-MLSE joint demodulation in multipath, applies the MLSE approach to correlations of the received signal with a plurality of CDMA signals. All three exemplary embodiments can be adapted to single signal demodulation or to multiple signal demodulation without ISI rejection.

Unlike the conventional RAKE receiver which operates on one CDMA signal at a time, a plurality of CDMA signals can be demodulated jointly according to exemplary embodiments of the present invention. Also, knowledge of the autocorrelation function of the CDMA signal is exploited to improve performance, and overlap of one transmitted symbol with the next is accounted for.

Unlike joint demodulation with no multipath, exemplary embodiments of the present invention take advantage of the multiple signal images created by a multipath channel. Moreover, exemplary embodiments of the present invention exploit knowledge of signal autocorrelation functions and of signal crosscorrelation values at various shifts.

BRIEF DESCRIPTION OF THE DRAWINGS

These and other objects, features and advantages of the present invention will be readily apparent to those skilled in the art from the following written description, read in conjunction with the drawings, in which.

DETAILED DESCRIPTION

Figure 1:
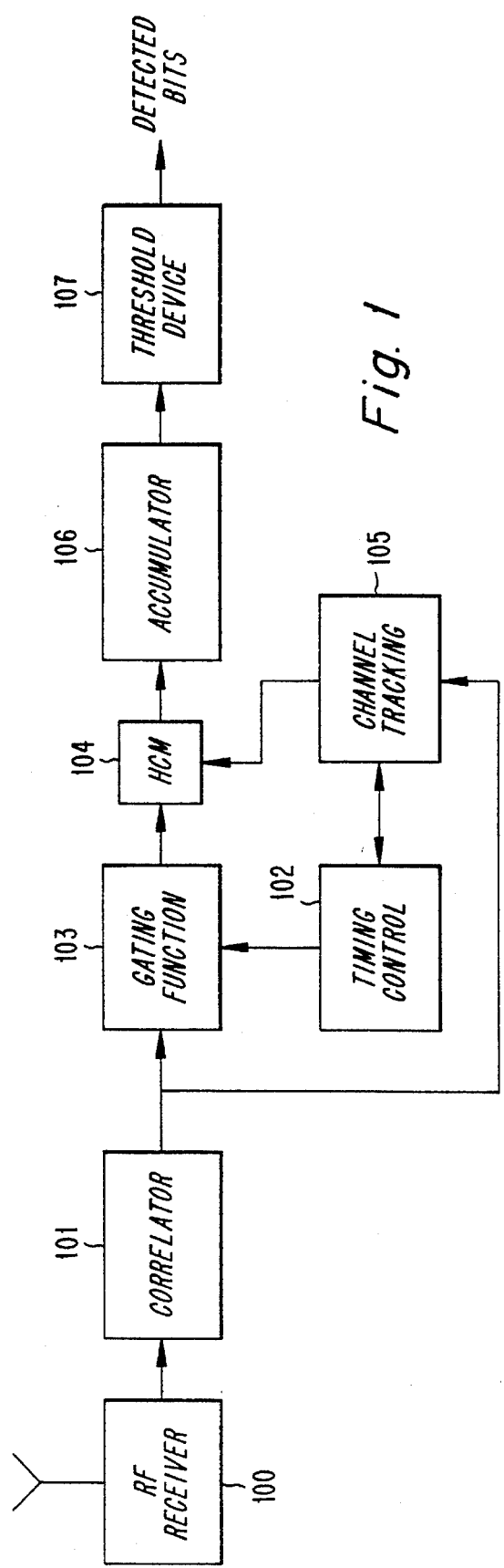
FIG. 1 is a block diagram illustrating a conventional RAKE receiver.
Figure 4:
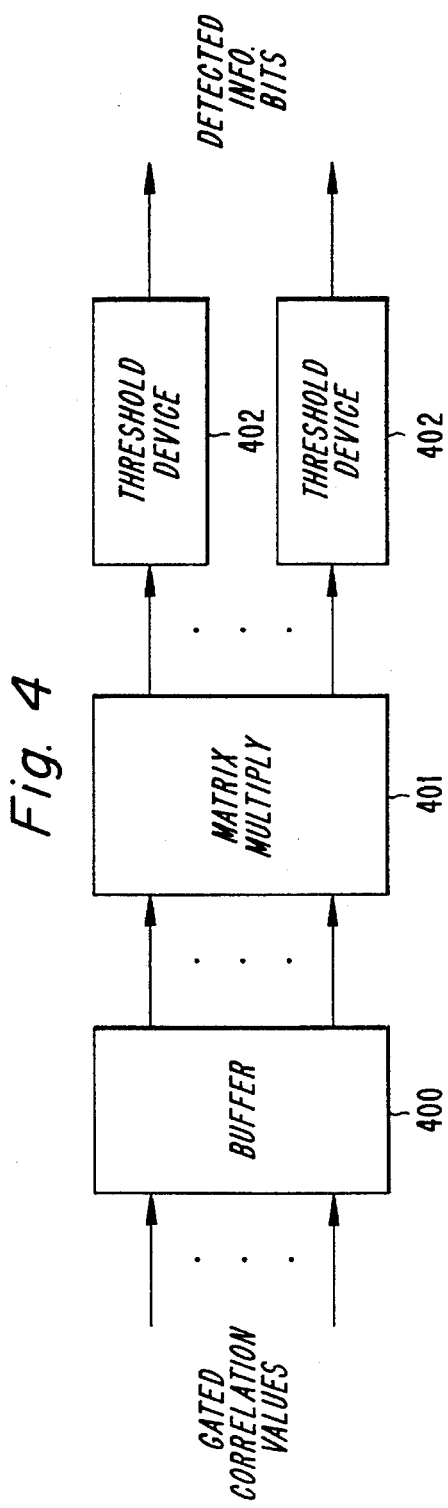
FIG. 4 is a block diagram illustrating a conventional decision algorithm for the decorrelation receiver.
Figure 2:
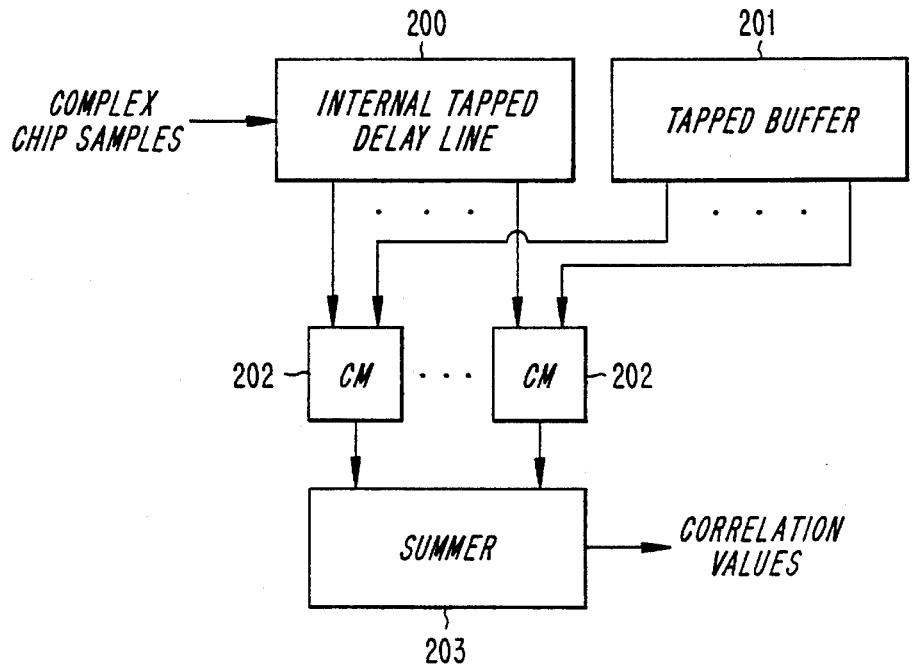
FIG. 2 is a block diagram describing in more detail the correlator of FIG. 1.

In the following description, for purposes of explanation and not limitation, specific details of exemplary embodiments are set forth, such as particular circuits, circuit components, techniques, etc., to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail. Moreover, although the following description is in the context of cellular communications systems involving portable or mobile radio telephones and/or personal communication networks, it will be understood by those skilled in the art that the present invention may be applied to other communications applications.

In addition to being applicable to plural or singular CDMA signals presented to a receiver, the present invention can be applied to particular subsets of the CDMA signals which are presented to the receiver. For example, the present invention can be applied for joint demodulation of two signals, a desired transmission and a pilot signal. Alternately, the desired signal and a plurality of pilot signals can be jointly demodulated, where only some of the pilot signals included are intended to aid in the demodulation of the desired signal.

A first exemplary embodiment of the present invention is referred to herein as MLSE joint demodulation in multipath. According to this exemplary embodiment, the most likely information symbol sequences for a plurality of CDMA signals are determined. The basic principle is as follows. Assume that, from past demodulation steps, knowledge of channel tap coefficients is available for each ray of each CDMA signal. Then, for a particular set of hypothetical information symbol values, one can construct a hypothetical received signal. The difference between the actual received signal and the hypothetical one is a residual signal which, when the hypothesis is correct, is the noise signal. The hypothesis which best predicts the received signal will minimize the energy in this residual signal. Thus, the approach is to find the set of information symbol sequences which minimizes the energy in the residual signal.

This can be expressed compactly in mathematical form. Suppose there are a plurality of CDMA signals $x_i$, where i is the signal index. Suppose each signal passes through a baseband equivalent channel with impulse response $h_i(t)$ given by $$h_i(t) = \sum_m c_i(m) \delta(t - m T_c)$$

where $T_c$ is the chip period, $c_i(m)$ are the channel tap coefficients, and $\delta(t)$ is the Dirac delta function which is non-zero when t=0. The channel tap coefficients may include the effects of the transmitter and receive filtering operations. Using complex baseband channel modeling, as described, for example, in J. G. Proakis, Digital Communications, second edition, New York: McGraw-Hill, 1989, the $c_i(m)$ values are complex numbers. The received signal, sampled once per chip, is given by $$R(k) = \sum_i \sum_n b_i(n) \sum_m c_i(m) x_i(k - m - nN) + n(k)$$

where n(k) denotes the noise sequence, $b_i(n)$ denotes the information symbol sequence for signal i and $x_i(k)$ denotes the signature sequence for signal i, i.e. $x_i(k)$ is non-zero for k=0 ... N−1, where N is the length of the sequence. The information symbol may be binary (±1), quaternary (±1, ±j) or have some other M'ary form. Also, information may be stored based on how the information symbol changes from one symbol period to the next, using differential modulation.

It is assumed the receiver has knowledge of the signature sequences $x_i(k)$ and can estimate the channel tap coefficients $c_i(m)$. Let $b_{i,h}(n)$ denote a hypothetical information data sequence for signal i. For a particular hypothesized set of information data sequences, $B_h = \{b_{0,h}(n), b_{1,h}(n), \ldots\}$, the hypothesized received signal is given by $$R_h(k) = \sum_i \sum_n b_{i,h}(n) \sum_m c_i(m) x_i(k - m - nN)$$

The residual signal is the difference signal $R(k) - R_h(k)$. The energy in the residual signal is given by $$J = \sum_k |R(k) - R_h(k)|^2$$

Thus, to optimize demodulation, it is desirable to find the set of information sequences which minimizes the total standard metric J.

It should be pointed out that the channel tap values $c_i(m)$ may be time varying, i.e., vary slowly with k. Thus, strictly speaking, $c_i(m)$ should be replaced with $c_i(m,k)$. However, this variation is assumed to be slow enough to be tracked by a channel tracking algorithm.

Figure 5:
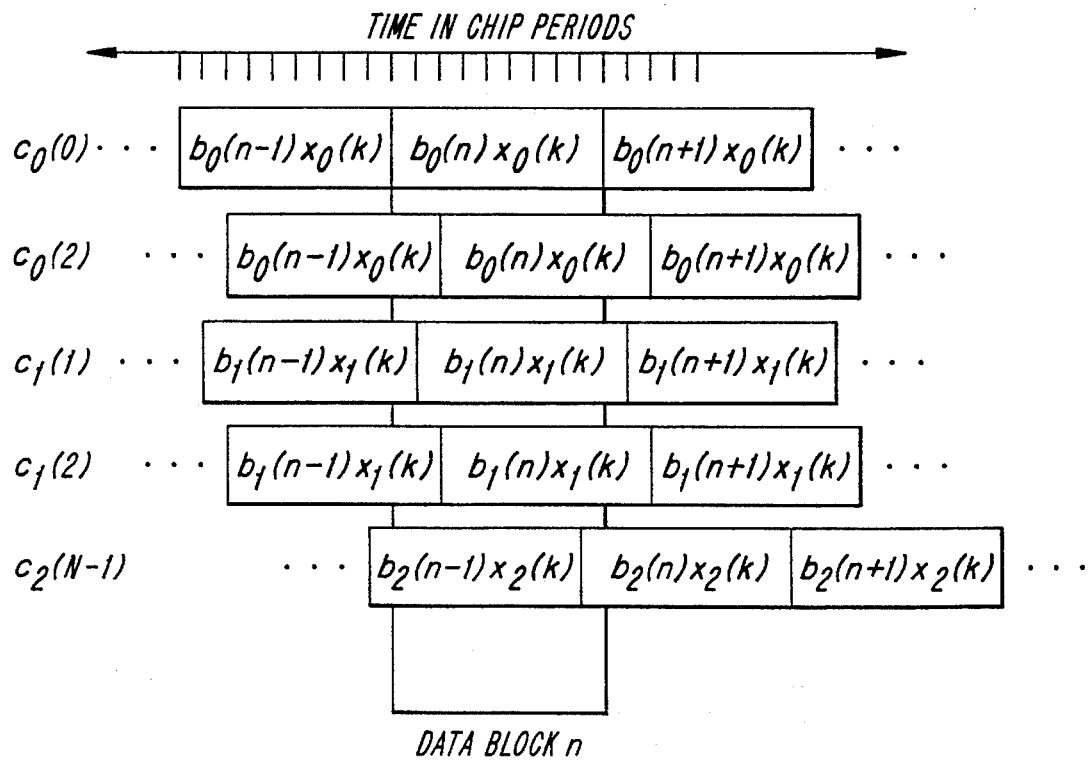
FIG. 5 shows exemplary received signals used to illustrate the present invention.
Figure 3:
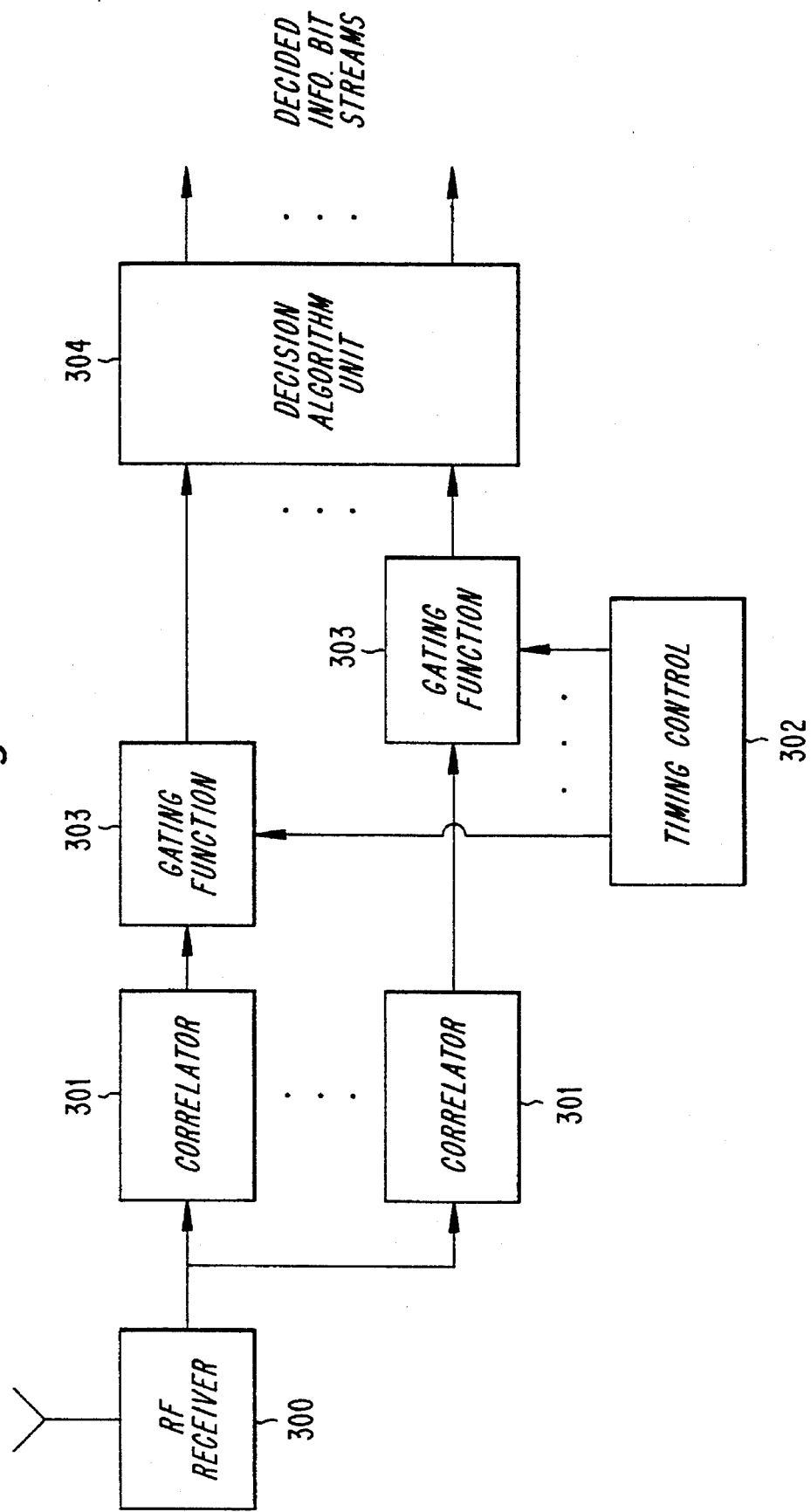
FIG. 3 illustrates a conventional system for joint demodulation of CDMA signals.

Since the data samples arrive sequentially, the received data are processed in blocks, where each block contains an entire image of the earliest arriving signal ray. Thus, the n'th received data block is only affected by the information bit values up to and including bit sequence index n (bit values for index n+1, n+2 ... do not impact these data). An example of this is shown in FIG. 5. The first signal, signal 0, has the earliest arriving ray with channel coefficient $c_0(0)$. An echo delayed 2 chip periods is also present, with channel coefficient $c_0(2)$. A second signal has two rays with relative delays 1 and 2 and channel coefficients $c_1(1)$ and $c_1(2)$ respectively. Finally, a third signal has a single ray with the largest possible delay N−1. If the delay were increased to N, then the information bit sequence index n would be incremented so that the relative delay would in effect be 0.

The Viterbi algorithm consists of updating past states, corresponding to hypothetical information symbol values at bit time n−1{$b_0(n-1), b_1(n-1), \ldots$}, to give current states, corresponding to hypothetical information symbol values at bit time n {$b_0(n), b_1(n), \ldots$}. This assumes that the multipath time dispersion delay spread is less than one symbol period, which will be assumed for purposes of illustration. If this is not the case, then the past states would depend on bit time n−2, n−3 . . . as well.

For each current state, the Viterbi algorithm considers possible previous states. For each possibility, a candidate metric is formed, which is the previous state's accumulated metric plus the delta metric corresponding to the previous and current state hypothesis. The candidate metric which is either smallest or largest, depending on how the metric is defined, becomes the accumulated metric for the current state. Also, the previous state which led to this new accumulated metric becomes the predecessor state of that current state. In this way current states are linked with past states. At some point, the current state with the best metric is determined, and the chain of predecessor states is used to determine the best hypothesized bit sequences.

Substitution of the expression for $R_h(k)$ into the expression for J gives exemplary receiver operations for MLSE joint demodulation in multipath. As discussed above, these receiver operations can be grouped into data block operations. Without further simplification, channel tap estimates and hypothesized bit values would be used to generate hypothesized received values $R_h(k)$ over a block of received data $R(k)$. The expression for J, evaluated over the block of data, would give rise to a block or delta metric.

The data block operations can be expressed in terms of generalized aperiodic correlation functions. The standard aperiodic correlation of sequence $a(k)$ with $b(k)$ is given by $$C_{a,b}(m) = \begin{cases} \sum_{j=0}^{N-1-m} a(j) b^*(j+m); & 0 \leq m \leq N-1 \\ \sum_{j=0}^{N-1+m} a(j-m) b^*(j); & -(N-1) \leq m < 0 \\ 0; & |m| \geq N \end{cases}$$

where * denotes complex conjugate. For some of the terms, the summation over j must be truncated. For these terms, a general aperiodic correlation is used $$C_{a,b}(m,s,f) = \begin{cases} \sum_{j=s}^{f} a(j) b^*(j+m); & 0 \leq m \leq N-1 \\ \sum_{j=s}^{f} a(j-m) b^*(j); & -(N-1) \leq m < 0 \\ 0; & |m| \geq N \end{cases}$$

Note that the standard aperiodic correlation function is a special case of the generalized one, where s=0 and f=N−1−|m|.

The resulting block or delta metric is given by $$J(\text{block } n) = \sum_k |r(k)|^2 -$$

$$2 Re \left[ \sum_{i\,m} c_i^*(m) \; [b_{i,h}(n-1) \, C_{r,x_i}(N-m) + b_{i,h}(n) \, C_{r,x_i}(-m)] \right] + \sum_i C_{x_i x_i}(0) \sum_m |c_i(m)|^2 +$$

$$2 Re \left[ \sum_{i\,m} \sum_{\substack{p \\ p>m}} c_i(m) \, c_i^*(p) \, [C_{x_i x_i}(-(p-m)) + b_{i,h}(n-1) \, b_{i,h}(n) \, C_{x_i x_i}(N-(p-m))] \right] +$$

$$2 Re \left[ \sum_i \sum_{\substack{j \\ j>i}} \sum_{m\,p} c_i(m) \, c_j^*(p) \, K \right]$$

where $K = b_{x_i,h}(n-1) \, b_{x_j,h}(n-1) \, C_{x_i x_j}(m-p, N-q, N-1-|m-p|) + b_{x_i,h}(n-1) \, b_{x_j,h}(n) \, C_{x_i x_j}(-(N-(m-p))) +$ $b_{x_i,h}(n) \, b_{x_j,h}(n-1) \, C_{x_i x_j}(N-(p-m)) +$ $b_{x_i,h}(n) \, b_{x_j,h}(n) \, C_{x_i x_j}(m-p, 0, N-1-q)$ q=max{p,m} and r(k) is the data block R(nN) to R(nN+N−1)

When the delta metric is added to the previously accumulated metric, the next step is to find the hypothesis which minimizes the new accumulated metric for each new state.

The delta metric can be simplified by ignoring terms common to all hypotheses. By negating the remaining metric, the following delta metric whose sum is to be maximized is obtained:

$$J'(\text{block } n) = B - C$$

where $$B = 2 Re \left[ \sum_{i\,m} c_i^*(m) [b_{i,h}(n-1) \, C_{r,x_i}(N-m) + b_{i,h}(n) \, C_{r,x_i}(-m)] \right]$$

$$C = 2 Re \left[ \sum_{i\,m} \sum_{\substack{p \\ p>m}} c_i(m) \, c_i^*(p) [b_{i,h}(n-1) \, b_{i,h}(n) \, C_{x_i x_i}(N-(p-m))] \right] +$$

$$2 Re \left[ \sum_i \sum_{\substack{j \\ j>i}} \sum_{m\,p} c_i(m) \, c_j^*(p) \, K \right]$$

where K is given above. Observe that term B is a function of aperiodic correlations of the received data with the known signature sequences, whereas term C is not a function of the data. Also, the metric does not depend on future information symbol values, such as $b_{i,h}(n+1)$. This has an advantage in reduced complexity, since the number of states in the Viterbi algorithm is reduced.

Figure 6:
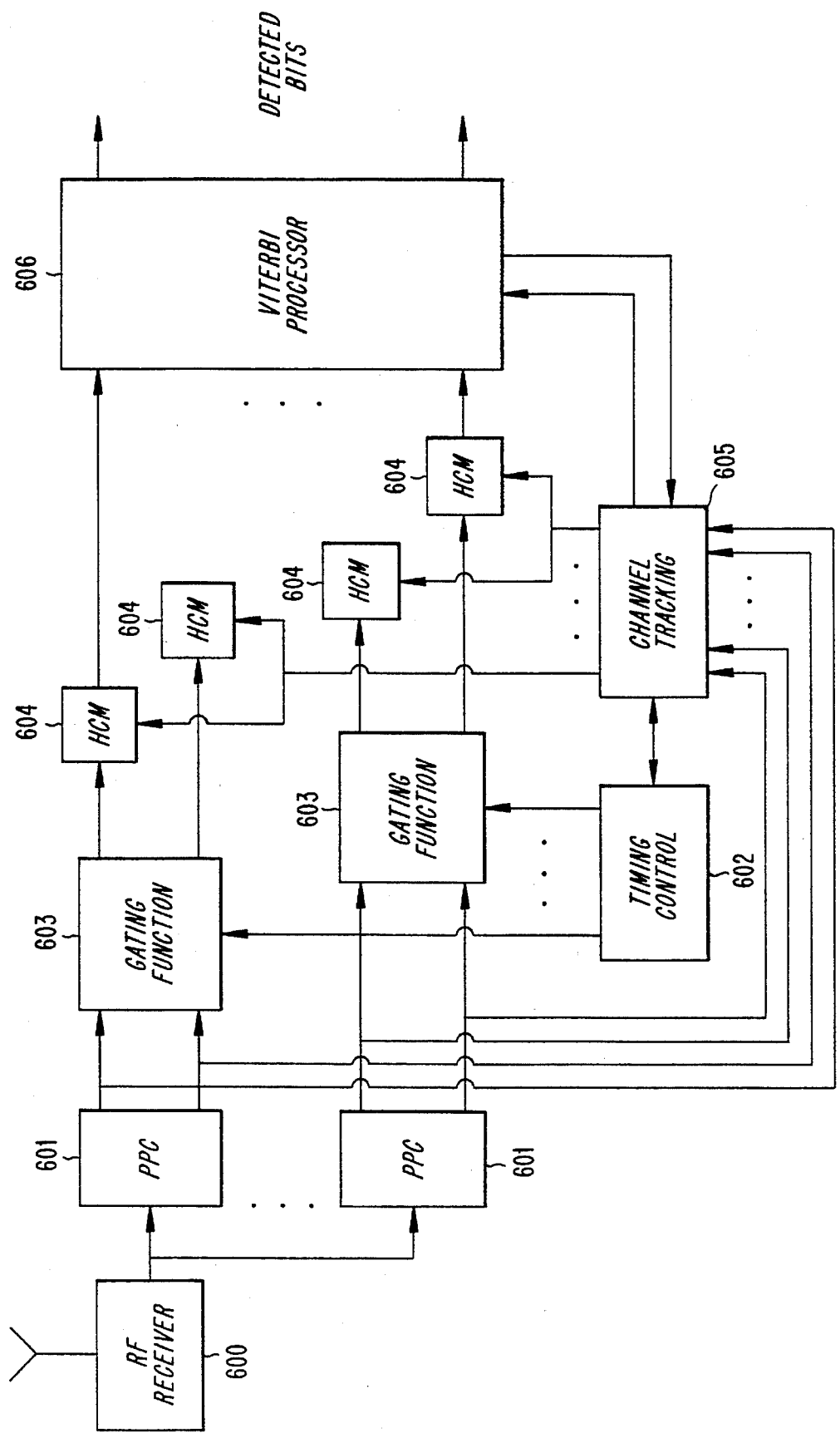
FIG. 6 is a block diagram of an exemplary receiver employing MLSE joint demodulation in multipath according to the present invention.

An exemplary receiver operating in accordance with the foregoing is shown in FIG. 6. An RF receiver 600 receives a plurality of CDMA signals in multipath. The receiver filters and mixes the composite signal down to baseband using, for example, cosine and sine functions, giving complex sampled data. Digitization of the received signals can be accomplished, for example, using log-polar signal processing which is described in U.S. Pat. No. 5,048,059 to Paul W. Dent entitled "Log-Polar Signal Processing", which patent is incorporated here by reference. These data samples are sent to a plurality of programmable partial correlators (PPCs) 601, which compute aperiodic correlations of the data with the signature sequences. Each PPC correlates to a different signature sequence. For every delay m, relative to the arrival of the earliest ray, the PPC computes two aperiodic correlations: $C_{r,x_i}(N-m)$ and $C_{r,x_i}(-m)$. A timing control unit 602 controls the data blocking within the PPC (control lines to PPCs not shown).

The gating functions 603 determine which of the multiple aperiodic correlation values, two per shift, are passed to half-complex multipliers (HCMs) 604, which compute the real part of the complex product of the complex correlations with the conjugates of the complex channel tap estimates, as provided by the channel tracking unit 605. These real products are then passed to the Viterbi processor 606, which uses this information to compute delta metrics for various hypotheses and to determine new state accumulated metrics. The gating functions 603 are controlled by the timing control unit 602. The channel tracking unit 605 receives correlation values from the PPCs 601, as well as timing information from the timing control unit 602, which allows it to track a time varying channel.

The Viterbi processor 606 also exploits knowledge of the aperiodic autocorrelation and crosscorrelation functions of the various signals. The Viterbi processor 606 ultimately provides estimates of information symbol sequences of all CDMA signals. It will be well known to those skilled in the art how soft information can also be extracted from the Viterbi processor. Soft information implies that instead of ±1 values being sent to, for example, a convolutional decoder, ±a(n) is sent which becomes larger for values having higher confidence. This soft information can be used to improve performance of the decoder. Soft information computation may require computing the energy in the received data block and passing this value onto the Viterbi processor.

Figure 7:
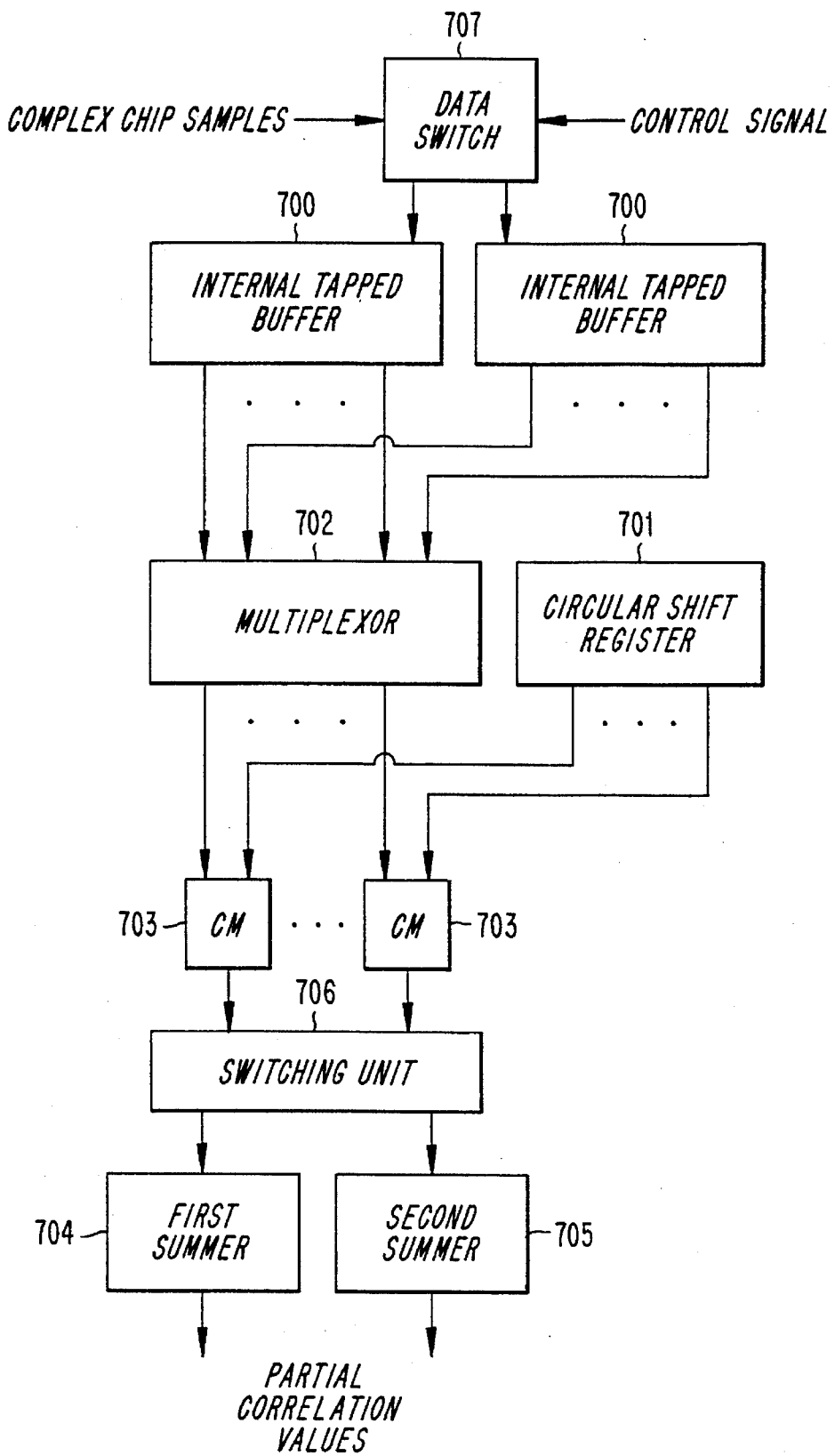
FIG. 7 is a block diagram of an exemplary programmable partial correlator.

An exemplary implementation of the programmable partial correlator (PPC) is shown in FIG. 7. The complex chip samples from the RF receiver are sent to one of two internal tapped buffers 700. The timing unit, 602 in FIG. 6, controls which of the two tapped delay lines is being filled, by signaling the data switch 707. In this way, one data block is processed while the next block is being fed in. The multiplexor 702 passes values from the internal tapped buffer that is full, i.e., ready to be processed. There is also a tapped circular shift register 70 1, which stores either the known signature sequence or its complex conjugate.

Once one block is available, i.e., one of the tapped buffers is filled, then the aperiodic correlations can be computed. They are computed in pairs, one pair for each shift of the circular shift register 701. For each shift, i.e., 0, 1, 2 and so on, the multiplexor 702 provides chip samples, which are multiplied by circular shift register 701 values using complex multipliers (CMs) 703. For shift m, the left most m products are sent to the first summer 704, which sums these to produce the aperiodic correlation $C_{r,x_i}(N-m)$. The remaining products are sent to the second summer 705, which sums these to produce $C_{r,x_i}(-m)$. The decision as to which products are sent to which summers is controlled by the switching unit 706. The partial or aperiodic correlations are sent to gating functions 603 as shown in FIG. 6. Once these two partial correlations have been computed, the circular shift register 701 is right shifted one additional shift and more partial correlations are computed. This description simply provides one example of how the PPC function can be implemented. Those skilled in the art will readily appreciate that other implementations can be used.

One skilled in the art will also be aware of a number of channel tracking methods that can be employed in the channel tracking unit 605, however, an example is given here for completeness. Within the Viterbi method, an update decision delay (updd) can be used to decide some past transmitted symbol values at time n'=n−updd for the purposes of channel tracking only. With these values decided, an error signal can be constructed which is simply the difference in the receive data and what the decided symbol values and estimated channel tap coefficients would predict. This error signal can be used by standard adaptive filters to improve the channel tap coefficient estimates. If needed, a predictive structure can be used to overcome the delay introduced by the update decision delay.

It will be apparent to one skilled in the art that by omitting or approximating certain of these computations, a receiver of lower complexity with some performance degradation can be obtained. Two such approximations are now considered.

In a first exemplary approximation, the effects of adjacent symbols, which cause ISI, are ignored. This is a relatively accurate approximation if the delays m are small relative to the sequence length N. In this case, instead of two partial correlations per ray, the receiver performs one full correlation of the data with the signature sequence per ray, as is done, for example, in the conventional RAKE receiver. However, unlike the conventional RAKE receiver, multiple CDMA signals are jointly demodulated and signature sequence autocorrelation and crosscorrelation functions are exploited.

As a result, the cost function J becomes $$J(\text{block } n) = \sum_k |r(k)|^2 -$$

$$\sum_i b_{i,h}(n) \, 2 \, Re \left[ \sum_m c_i^*(m) \, C_{r,x_i}(-m, 0, N-1) \right] +$$

$$\sum_i C_{x_i x_i}(0) \sum_m |c_i(m)|^2 +$$

$$2 \, Re \left[ \sum_i \sum_m \sum_{\substack{p \\ p>m}} c_i(m) \, c_i^*(p) \, C_{x_i x_i}(m-p) \right] +$$

$$\sum_i \sum_{\substack{j \\ j>i}} b_{i,h}(n) \, b_{j,h}(n) \, 2 \, Re \left[ \sum_m \sum_p c_i(m) \, c_j^*(p) \, C_{x_i x_j}(m-p) \right]$$

where r(k) is now the data block R(nN) to R(nN+N+d−1) and d=maximum echo delay relative to arrival of earliest ray.

Again, ignoring tens common to all hypotheses and negating the remaining metric gives the following metric whose sum is to be maximized:

$$J'(\text{block } n) = B - C$$

where $$B = \sum_i b_{i,h}(n) \, Re \left[ \sum_m c_i^*(m) \, C_{r,x_i}(-m, 0, N-1) \right]$$

$$C = \sum_i \sum_{\substack{j \\ j>i}} b_{i,h}(n) \, b_{j,h}(n) \, Re \left[ \sum_m \sum_p c_i(m) \, c_j^*(p) \, C_{x_i x_j}(m-p) \right]$$

Note that term B is a function of correlations of the received data with the known signature sequences, whereas term C is not a function of the data. Also, the metric is not a function of hypothesized past information bit values. Thus, a Viterbi algorithm is unnecessary. Instead, one considers all hypotheses of the set of information symbol values for the plurality of signals at symbol time n and determines the set of symbol values which maximizes the J' metric.

Figure 8:
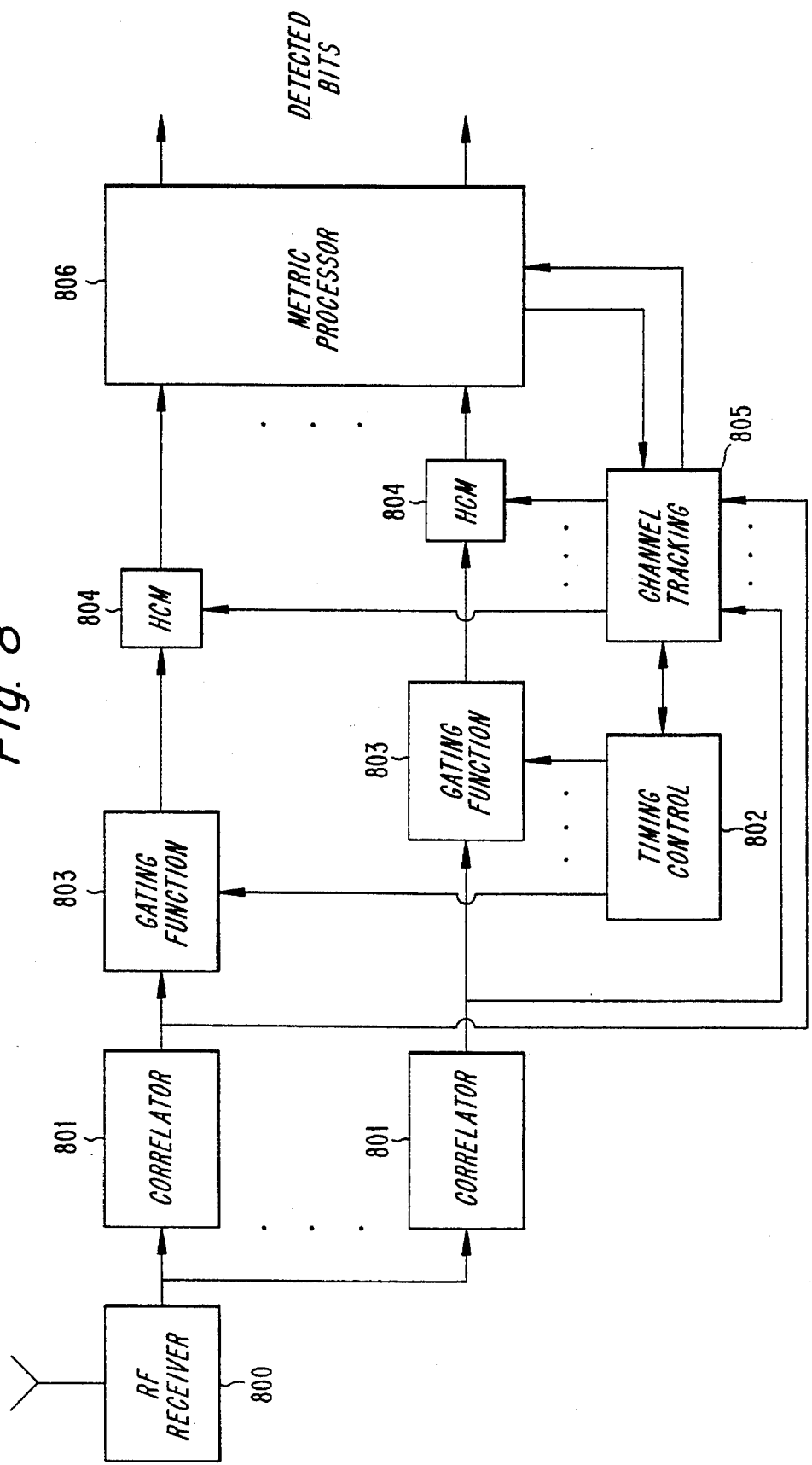
FIG. 8 is a block diagram of a receiver according to another exemplary embodiment having MLSE joint demodulation in multipath with ISI ignored.

An exemplary receiver operating according to these principles is shown in FIG. 8. An RF receiver 800 receives a plurality of CDMA signals in multipath. The receiver filters and mixes the composite signal down to baseband using, for example, cosine and sine functions, giving complex sampled data. These data samples are sent to a plurality of correlators 801, which compute correlations of the data with the signature sequences. Each correlator correlates to a different signature sequence.

The timing control unit 802 indicates to the gating functions 803 which correlation values are to be processed. For each CDMA signal, one correlation value per signal ray is processed. The gating functions 803 pass correlation values on to half complex multipliers (HCMs) 804, which compute the real part of the product of the correlation value with a channel tap estimate, as provided by the channel tracking unit 805. These real products are then passed to the metric processor 806, which uses this information to compute metrics for various information symbol hypotheses.

The channel tracking unit 805 receives correlation values from the correlators 801, timing information from the timing control unit 802, and detected symbol information from the metric processor 806. This allows the tracking unit to track a rime varying channel.

The metric processor 806 also exploits knowledge of the aperiodic autocorrelation and crosscorrelation functions of the various signals. The metric processor 806 ultimately provides estimates of information symbol sequences of all CDMA signals. It will be well known to those skilled in the art how soft information can also be extracted from the metric processor. Soft information computation may require computing the energy in the received data block and passing this value onto the metric processor.

Another exemplary embodiment uses a simplification in which only one CDMA signal, the desired signal, is demodulated. This is a single signal demodulator, but the autocorrelation function of the signal and the effects of ISI are considered, which is not the case with the conventional RAKE receiver. As before, a Viterbi algorithm is used to find the most likely transmitted symbol sequence.

Since only one signal is considered, the subscript i is dropped. The general metric then becomes $$J(\text{block } n) = \sum_k |r(k)|^2 -$$
$$2 Re \left[ \sum_m c^*(m)[b_h(n-1) C_{r,x}(N-m) + b_h(n) C_{r,x}(-m)] \right] +$$
$$C_{x,x}(0) \sum_m |c(m)|^2 + 2 Re \left[ \sum_m \sum_{\substack{p \\ p>m}} c(m) c^*(p)[C_{x,x}(-(p-m)) + b_h(n-1)b_h(n) C_{x,x}(N-(p-m))] \right]$$

where r(k) is now the data block R(nN) to R(nN+N–1). When the delta metric is added to the previously accumulated metric, the goal is to minimize the summed metric.

Again, ignoring terms common to all hypotheses, and negating the remaining metric, the following delta metric whose sum is to be maximized is obtained:

$$J'(\text{block } n) = B - C$$

where $$B = 2 Re \left[ \sum_m c^*(m) [b_h(n-1) C_{r,x}(N-m) + b_h(n) C_{r,x}(-m)] \right]$$

$$C = 2 Re \left[ \sum_m \sum_{\substack{p \\ p>m}} c(m) c^*(p) [b_h(n-1) b_h(n) C_{x,x}(N-(p-m))] \right]$$

Note that term B is a function of aperiodic correlations of the received data with the known signature sequence, whereas term C is not a function of the data.

The resulting receiver (not shown) is similar to that shown in FIG. 6. For example, instead of a plurality of signal chains, there would be one signal chain, comprising a single PPC 601, a single gating function 603, and two HCMs 604.

According to yet another exemplary embodiment of the present invention, referred to herein as decorrelation demodulation in multipath, new channel tap values and information symbol values for a plurality of CDMA signals that exactly predict correlations of the received signal with the conjugates of the signature sequences are determined. The basic approach is to write a set of equations in terms of known values (autocorrelation and crosscorrelation values), measured values (correlations of the received data with the signature sequences), and unknown values (information symbol values and new channel tap coefficients). Then, this set of equations is solved to determine the new channel tap coefficients and the detected information symbol values.

Initially, the correlations of various portions of the received data with the conjugates of the known signature sequences are measured. Like the RAKE receiver, a correlation is performed over the portion of data where a ray of a signal is known to arrive. This measured correlation is denoted $Q_{r,x_p}(d)$ and is defined as $$Q_{r,x_i}(d) = \sum_{k=0}^{n-1} R(d+k)x_i^*(k)$$

For a given bit period, $n_0$, a given signal p, and a given ray with delay $m_0$, the correlation $Q_{r,x_p}(n_0 N + m_0)$ would be performed to collect the energy of ray $m_0$ during bit period $n_0$ for signal p.

The received signal is assumed to consist of a plurality of signals, each with a plurality of rays. Even though these signals are received in the presence of noise, the noise is not modelled by the decorrelation receiver. Thus, this exemplary approach is based on the received data sequence being modelled as $$R(k) = \sum_i \sum_n b_i(n) \sum_m c_i(m) x_i(k-m-nN)$$

where $b_i(n)$ is the n'th information symbol of the i'th signal, $c_i(m)$ is the m'th ray or channel tap coefficient of the i'th signal, and $x_i(k)$ is the signature sequence of the i'th signal.

Using this expression for the received signal, one can relate the measurement $Q_{r,x_p}(n_0 N + m_0)$ to bit values, channel tap coefficients, and aperiodic correlation values. This gives $$Q_{r,x_p}(n_0 N + m_0) = \sum_i \sum_n \sum_m C_{x_i,x_p}(m-m_0+(n-n_0)N) [b_i(n) c_i(m)]$$

This provides one equation relating the known measurement and known aperiodic correlation values to the unknown in brackets.

Thus, in principle, for a given bit period $n_0$, one can correlate the received data to different signature sequences $x_p(k)$ at different ray arrival times $m_0$. This leads to a set of equations which can be used to solve for the unknowns, denoted $y_i(n,m)$, which should be estimates of the products $b_i(n) c_i(m)$. Since the channel taps do not change much from symbol to symbol, a comparison of the previous or predicted channel tap value to the $y_i(n,m)$ should indicate the information symbol value. Results from multiple channel taps can be combined in a RAKE-like fashion, giving the detection statistic $$z_i(n) = \sum_m y_i(n,m)c_i^*(m)_{pred}$$

which can be used to form a detected value $b_i(n)_{det}$. For example, if the information symbols are binary, then $$b_i(n)_{det} = \text{sgn}(Re\{z_i(n)\})$$

Should differential modulation be employed, the following differential detection statistic may be formed:

$$z_i = z_i(n)z_i^*(n-1)$$

However, unlike the conventional RAKE receiver, a decorrelation process to find the term $y_i(n,m)$ is first needed.

Because $m-m_0$, the difference in ray arrival times, is within the range $[-(N-1), N-1]$ and the aperiodic correlation is zero for shifts greater than $N-1$ or less than $-(N-1)$, the summation over n can be restricted to cover $n_0-1$, $n_0$, and $n_0+1$. In essence, a measured correlation is only a function of the current, previous, and next transmitted symbol. This gives $$Q_{r,x_p}(n_0N + m_0) = \sum_i \sum_{n=n_0-1}^{n_0+1} C_{x_i,x_p}(m - m_0 + (n - n_0)N) y_i(n,m)$$

Because the equation includes previous, current, and next symbol values, and processing is sequential in time, there are never enough equations to solve for the bracketed terms. In other words, the equations are all linked to past and future equations. However, there are techniques for finding approximate solutions, for example, those discussed in S. S. H. Wijayasuriya, G. H. Norton, and J. P. McGeehan, "A near-far resistant sliding window decorrelating algorithm for multi-user detectors in DS-CDMA systems," Proc. Globecom '92, Orlando, Fla., pp. 1331–1338, Dec. 1992.

Figure 9:
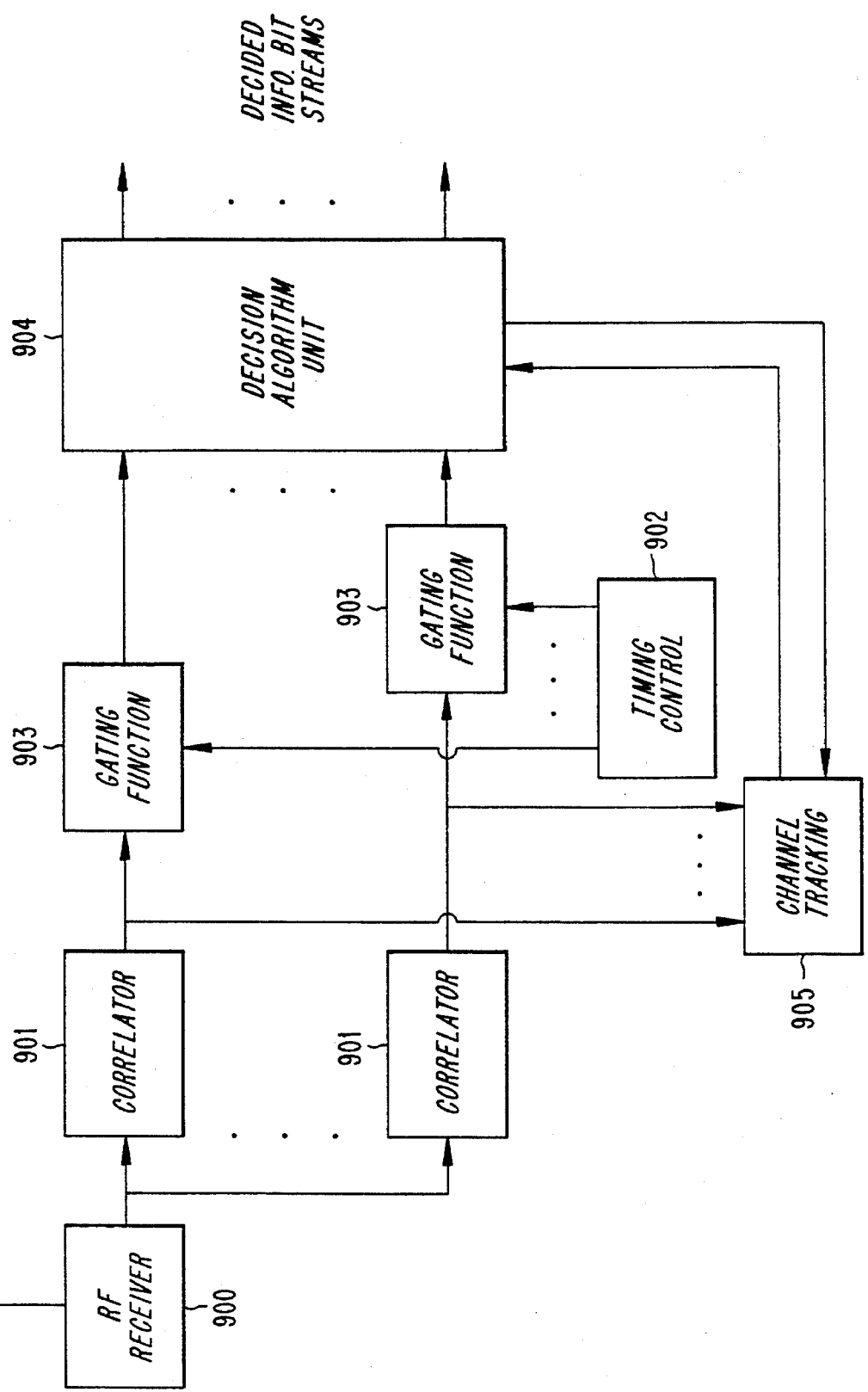
FIG. 9 is a block diagram illustrating an exemplary decorrelation demodulation in multipath time dispersion embodiment of the present invention.

An exemplary receiver operating in accordance with the foregoing is shown in FIG. 9. An RF receiver 900 receives a plurality of CDMA radio signals which are filtered and mixed down to I and Q baseband waveforms, which are sampled and quantized yielding complex received data values. These are sent to a plurality of correlators 901, each of which correlates to a particular signature sequence. The channel is assumed to have multipath time dispersion, so that a plurality of correlation values are kept per transmitted symbol. The ones selected for use in demodulation are determined by the timing control unit 902, which signals the gating functions 903 to pass a value once per signal ray per transmitted symbol period. Because the different CDMA signals may not be time aligned, i.e., asynchronous, the gates do not necessarily close at the same time. The correlation values are passed to a decision algorithm unit 904, which uses this information to decide the transmitted symbol sequences of each CDMA channel. The channel tracking unit 905 receives a plurality of correlations from each correlator 901, which it uses to estimate and track signal ray positions and channel tap coefficient values.

This exemplary receiver has several advantages. First, it performs coherent combining of the decorrelated rays using knowledge of the channel taps. Second, it does not require noncausal filtering. Third, it allows for asynchronous signals and addresses intersymbol interferences. Finally, the decorrelation step uses signal crosscorrelation properties, whereas the ray combining step uses channel properties. Thus, these two types of properties are kept separate, allowing one to be adapted independently of the other.

Figure 10:
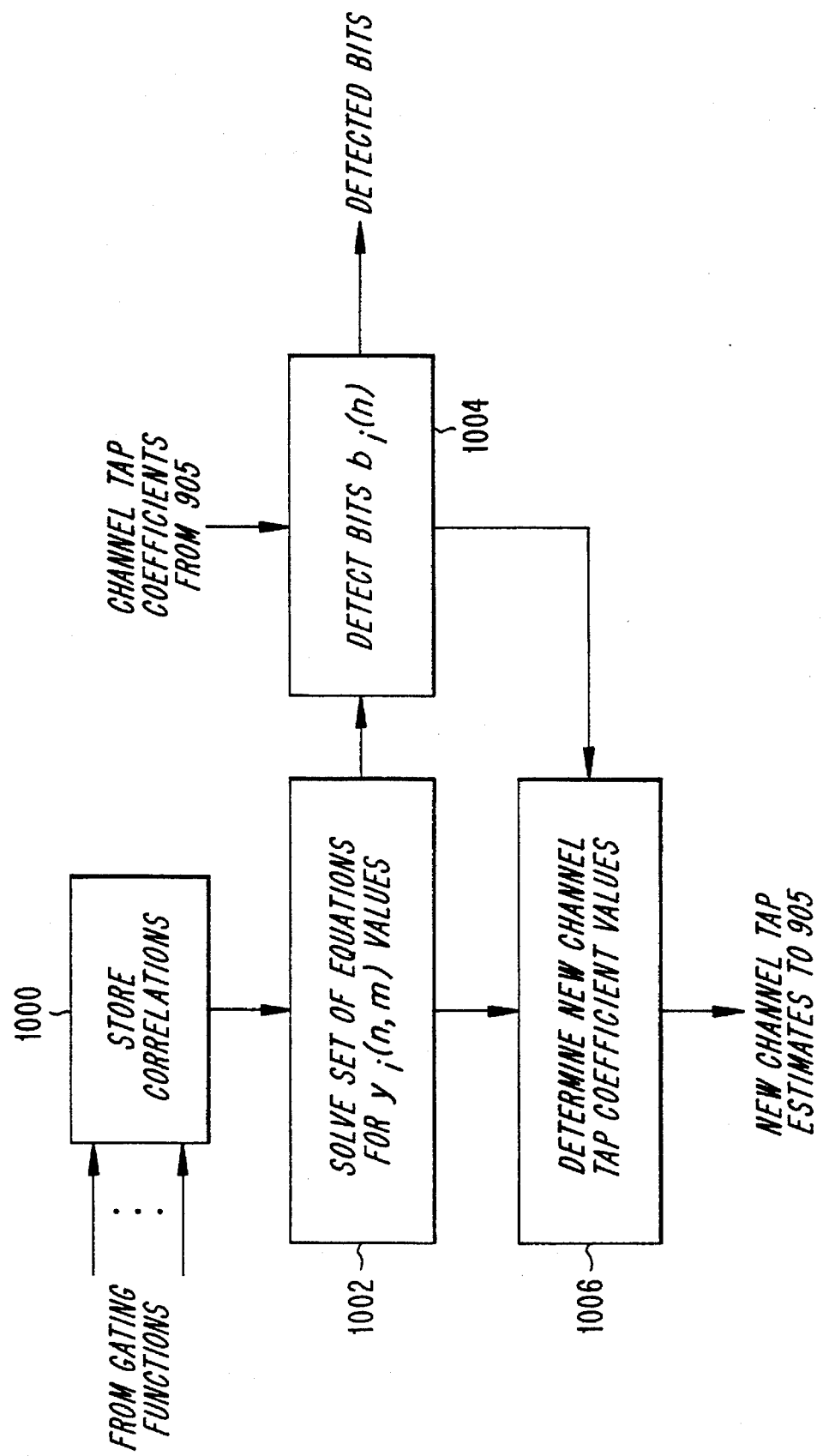
FIG. 10 is a flow chart illustrating decorrelation in multipath.

An exemplary method which can be performed by the decision unit 904 is shown in FIG. 10. At block 1000, correlation values are received from the gating functions 903 and stored. Then, when a sufficient number of them are available, the sets of equations are solved for some bit period n to given $y_i(n,m)$ at block 1002. Knowledge of the channel tap coefficients received from the channel tracking unit 905 are used to detect symbols $b_i(n)$ at 1004 for all i values (i.e., for all signals). This implies a new channel tap coefficient measurement, which is determined at block 1006 and fed to the channel tracking unit 905.

One skilled in the art will be aware of a number of channel tracking methods that can be employed in the channel tracking unit 905, however an example is given here for completeness. Within the decision unit, the quantities $y_i(n, m)$ are solved for. Once the symbol values $b_i(n)$ have been determined (which may require a decision delay), then new estimates of the channel taps $c_i(m)$ are given by $y_i(n,m)/b_i(n)$. If the values $b_i(n)$ are assumed to be binary, the division can be replaced by a multiplication. Thus, a simple exponential smoothing filter can be used to average the new estimate with previous estimates.

Noise whitening techniques can be applied to decorrelated ray values associated with a particular signal. Techniques for noise whitening are discussed in Z. Zvonar and D. Brady, "Suboptimum multiuser detector for synchronous CDMA frequency-selective Rayleigh fading channels," Communication Theory Mini-Conference, Orlando, Fla., Dec. 6–9, 1992 which is incorporated here by reference. Thus in the decision unit 904, the quantities $y_i(n,m)$ associated with a particular i (i.e., a particular user) and particular n (i.e., a particular symbol period) may be passed through a noise whitening process prior to the combining process, which would be modified accordingly.

Also, minimum mean square estimation (MMSE) techniques can be applied to possibly enhance the decorrelation process. An example of this, without multipath time dispersion, is given in Z. Xie, R. T. Short, and C. K. Rushforth, "A family of suboptimum detectors for coherent multiuser communications," IEEE Journal on Selected Areas in Communications, vol. 8, pp. 683–690, May 1990. With multipath time dispersion, this technique can be used by adding a value proportional to the noise power to the $C_{x_i, x_p}(m-m_0+(n-n_0)N)$ terms for which $m=m_0$, $n=n_0$, and $i=p$, that is by adding a value to one of the correlation terms in each equation. This assumes the noise is white, having a flat spectrum. If this is not the case, values can be added to other terms to account for the noise being correlated.

In a manner similar to that discussed with respect to the first exemplary embodiment, it will be apparent to one skilled in the art that by omitting or approximating certain of these computations, a receiver of lower complexity with some performance degradation can be obtained. Three such approximations are now considered.

Again, the effects of adjacent symbols, which cause ISI, may be ignored in certain cases. This provides a relatively good approximation if the delays m are small relative to the sequence length N. In this case, measurements taken for the $n_0$'th transmitted symbol give a sufficient number of equations to solve for the $n_0$'th transmitted bits of the multiple CDMA signals. Each equation has the form:

$$Q_{r,x_p}(n_0N + m_0) = \sum_i \sum_m C_{x_i,x_p}(m - m_0) y_i(n_0,m)$$

where $y_i(n_0, m)$ are the unknowns to be solved for, giving estimates of $b_i(n_0)c_i(m)$. Thus, for a given $n_0$, one can solve for the symbols $b_i(n_0)$ by solving a set of equations for the unknowns $y_i(n_0,m)$, then using the detection statistic:

$$z_i(n_0) = \sum_m y_i(n_0,m) c_i^*(m)_{pred}$$

An exemplary receiver for performing this procedure could have similar structure to that of FIG. 9.

For a second approximation, instead of ignoring ISI, other CDMA signals are ignored. This gives a single signal detector. The structure for an exemplary receiver operating in this manner is similar to that of FIG. 9, except, for example, there is only one correlator 901 and one gating function 903. The equations to be solved have the form $$Q_{r,x_p}(n_0N + m_0) = \sum_{n=n_0-1}^{n_0+1} \sum_m C_{x_p,x_p}(m - m_0 + (n - n_0)N) y_p(n,m)$$

where the unknowns to be solved for are $y_p(n,m)$, which give estimates of $b_p(n)$ and $c_p(m)$.

Finally, by using both the first and second approximations together, a third approximation is obtained. This is a single signal detector which ignores ISI. As a result, a set of decorrelation equations can be written which can be solved for the information bit at bit time $n_0$. There is one equation for each signal my of the form $$Q_{r,x_p}(n_0N + m_0) + \sum_m C_{x_p,x_p}(m - m_0) y_p(n_0,m)$$

This set of equations is used to solve for $y_p(n_0, m)$ for different rays m. The detected statistic is then formed by $$z_i(n_0) = \sum_m y_i(n_0,m) c_i^*(m)_{pred}$$

as before.

Yet another exemplary embodiment of the present invention is referred to herein as pseudo-MLSE demodulation in multipath. According to this embodiment, the most likely information bit sequences for a plurality of CDMA signals are determined, assuming the data provided are noisy correlation values. Since, in reality, noise is added prior to correlation, the pseudo-MLSE approach may not perform as well as the MLSE approach. However, the pseudo-MLSE may be easier to implement.

The basic principle is as follows. Assume that, from past demodulation steps, knowledge of channel tap coefficients is available for each ray of each CDMA signal. Then, for a particular set of hypothetical information symbol values, one can construct hypothetical correlation values. The difference between the measured correlation values and the hypothetical ones is a residual signal which, when the hypothesis is correct, is a type of noise signal. The hypothesis which best predicts the correlations will minimize the energy in this residual signal. Thus, the approach is to find the set of information symbol sequences which minimizes the energy in the residual signal.

The correlations corresponding to signal rays are the "data" that are assumed to be corrupted by additive white Gaussian noise. Thus, they are modeled as $$Q_{r,x_p}(n_0N + m_0) = z(n_0N + m_0) +$$

$$\sum_i \sum_{n=n_0-1}^{n_0+1} \sum_m C_{x_i,x_p}(m - m_0 + (n - n_0)N) c_i(m) b_i(n)$$

where the $z(n_0N+m_0)$ are assumed to be noise samples. The goal is to find the information symbol values that minimize the total energy in the $z(t)$ process. Unlike the earlier-described decorrelation receiver, the channel tap coefficients are now part of the "known", leaving only the bit values as the "unknown".

For a given symbol period, $n_0$, correlations are performed on each ray of each signal. In essence, $n_0$ is fixed, and different $m_0$ and p values are used to take measurements $Q_{r,x_p}(n_0N+m_0)$. According to the expression above, these measurements depend on symbol values during bit periods $n_0-1$, $n_0$, and $n_0+1$.

Thus, suppose one hypothesizes symbol values for symbol periods $n_0-1$, $n_0$, and $n_0+1$. Then, for each hypothesis, an estimate of the noise sample can be obtained by $$\hat{z}(n_0N + m_0) = Q_{r,x_p}(n_0N + m_0) -$$

$$\sum_i \sum_{n=n_0-1}^{n_0+1} \sum_m C_{x_i,x_p}(m - m_0 + (n - n_0)N) c_i(m) b_i(n)$$

The next step is to find the set of consistent hypotheses that minimizes the energy in the estimates noise sequence.

As with the MLSE approach, the Viterbi algorithm can be applied. For measurements taken during symbol period $n_0$, the previous states would be all possibilities of $\{b_0(n_0-1), b_0(n_0), b_1(n_0-1), b_1(n_0), \ldots \}$. The current states would be all possibilities of $\{b_0(n_0), b_0(n_0+1), b_1(n_0), b_1(n_0+1), \ldots \}$. Thus, a transition from a previous state to a current state corresponds to a hypothesis $\{b_0(n_0-1), b_0(n_0), b_0(n_0+1), b_1(n_0-1), b_1(n_0), b_1(n_0+1), \ldots \}$. Only consistent transitions, where $b_i(n_0)$ is the same in both previous and current state, would be considered.

For each hypothesis, the candidate metrics for the current state would be the sums of the previous state metric and the corresponding delta metric given by $$J_h(n_0) = \sum_p \sum_{m_0} | Q_{r,x_p}(n_0N + m_0) -$$

$$\sum_i \sum_{n=n_0-1}^{n_0+1} \sum_m C_{x_i,x_p}(m - m_0 + (n - n_0)N) c_i(m) b_{i,h}(n) |^2$$

where the summation over $m_0$ is over the values where signal p has a ray. The goal for this metric is to minimize the total metric. Observe that the terms can be rearranged to give $$J_h(n_0) = \sum_p \sum_{m_0} | Q_{r,x_p}(n_0N + m_0) - \sum_i \sum_{n=n_0-1}^{n_0+1} b_{i,h}(n) S_{i,p}(n_0,n,m_0) |^2$$

where $$S_{i,p}(n_0,n,m_0) = \sum_m C_{x_i,x_p}(m - m_0 + (n - n_0)N) c_i(m)$$

It should be noted that the summation over $m_0$ need not cover all the rays, as is the case for the summation over m. This corresponds to using fewer measurements.

As with the MLSE, the metric can be expanded and those terms common to all hypotheses can be dropped. This leads to the following delta metric, whose total metric should be maximized $$J'_h(n_0) = \sum_p \sum_{m_0} 2 Re [Q_{r,x_p}(n_0N + m_0) U^*_{p,h}(n_0,m_0)] - | U_{p,h}(n_0,m_0) |^2$$

where $$U_{p,h}(n_0,m_0) = \sum_i \sum_{n=n_0-1}^{n_0+1} b_{i,h}(n) S_{i,p}(n_0,n,m_0)$$

Figure 11:
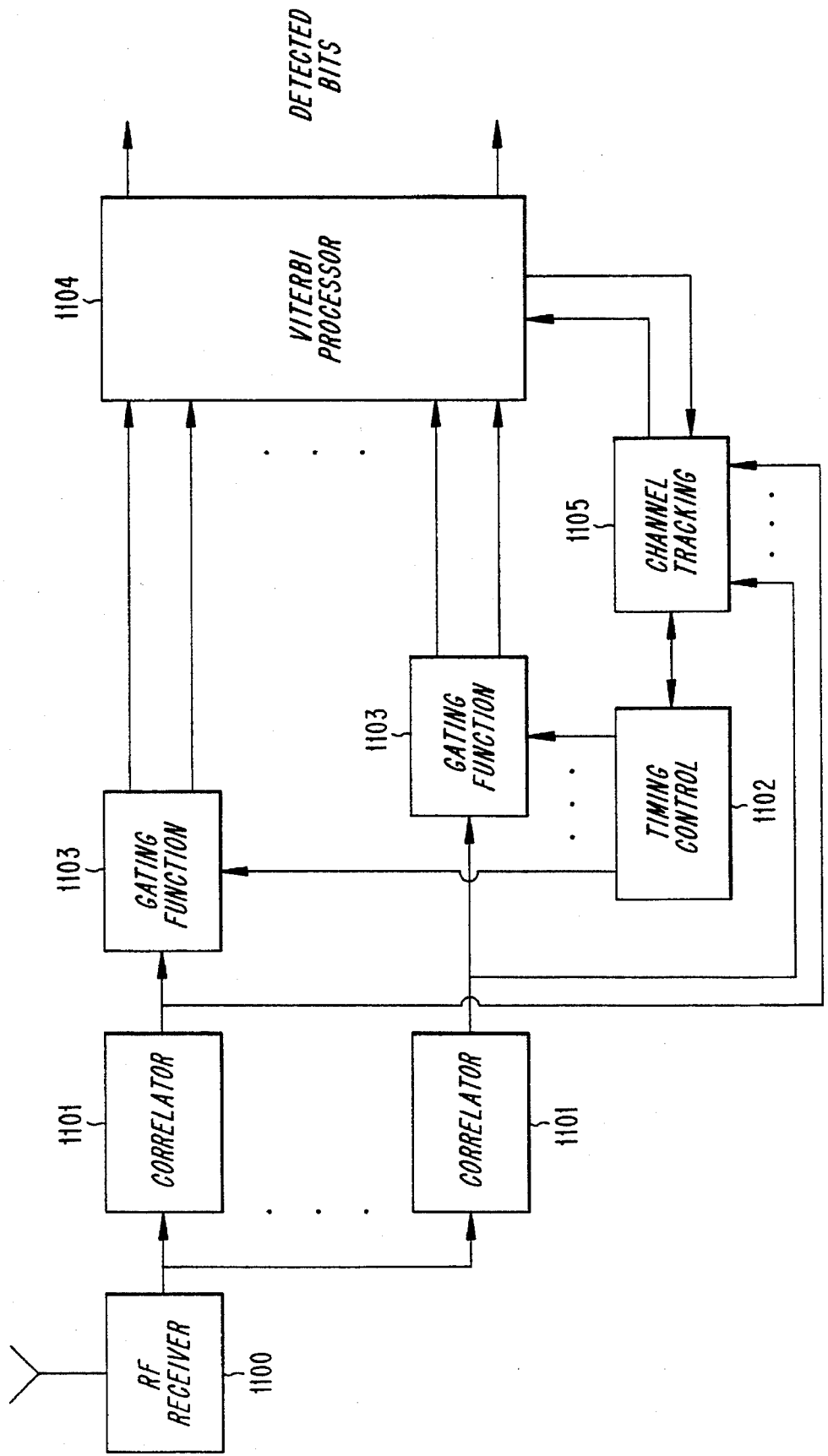
FIG. 11 is a block diagram of an exemplary receiver employing pseudo-MLSE demodulation in multipath dispersion according to the present invention.

A block diagram of an exemplary receiver operating according to the foregoing principles is shown in FIG. 11.

An RF receiver 1100 receives a plurality of CDMA radio signals which are filtered and mixed down to I and Q baseband waveforms, which are sampled and quantized yielding complex received data values. These are sent to a plurality of correlators 1101, each of which correlates to a particular signature sequence. The channel is assumed to have multipath time dispersion, so that a plurality of correlation values are kept per transmitted symbol. The ones selected for use in demodulation are determined by the timing control unit 1102, which signals the gating functions 1103 to pass a value once per transmitted symbol period. Because the different CDMA signals may not be time aligned, i.e., asynchronous, the gates do not necessarily close at the same time. The correlation values are passed to a Viterbi unit 1104, which uses this information to decide the transmitted symbol sequences of each CDMA channel. The channel tracking unit 1105 receives a plurality of correlations from each correlator 1101, which it uses to estimate and track signal ray positions and channel tap coefficient values.

One skilled in the art will be aware of a number of channel tracking methods that can be employed in the channel tracking unit 1105, however, one example is given here for completeness. Within the Viterbi algorithm, an update decision depth can be used to decide some past transmitted symbol values at time n' for the purposes of channel tracking only. With these values decided, an error signal can be constructed which is simply the difference in the receive data and what the decided symbol values and estimated channel tap coefficients would predict. This error signal can be used by standard adaptive filters to improve the channel tap coefficient estimates. If needed, a predictive structure can be used to overcome the delay introduced by the update decision depth.

As mentioned earlier with respect to other exemplary embodiments, it will be apparent to one skilled in the art that by omitting or approximating certain of these computations, a receiver of lower complexity with some performance degradation can be obtained. Three such approximations are now considered.

In the first approximation, the effects of adjacent symbols, which cause ISI, are ignored. This is a relatively accurate approximation if the delays m are small relative to the sequence length N. In this case, measurements taken for the n'th transmitted symbol can be used directly to determine the $n_0$'th symbol period bit values; no Viterbi trellis is necessary. For each symbol hypothesis at symbol period $n_0$, the detected symbols are those which maximize the following metric:

$$J'_h(n_0) = \sum_p \sum_{m_0} 2\, Re\, [Q_{r,x_p}(n_0 N + m_0)\, U^*_{p,h}(n_0,m_0)] - |U_{p,h}(n_0,m_0)|^2$$

where $$U_{p,h}(n_0,m_0) = \sum_i b_{i,h}(n_0)\, S_{i,p}(n_0,n_0,m_0)$$

$$S_{i,p}(n_0,n_0,m_0) = \sum_m C_{x_i,x_p}(m - m_0)\, c_i(m)$$

The structure is the same as in FIG. 11, only now the Viterbi processor 1104 is replaced by a metric processor.

The metric processor computes $J'_h(n_0)$ for each possible hypothesis of $\{b_0(n_0), b_1(n_0), \ldots\}$. It then determines which hypothesis gives the largest $J'_h(n_0)$ value. This hypothesis gives the detected information symbol values.

For the second approximation, instead of ignoring ISI, other CDMA signals are ignored. This gives a single signal detector for signal p. The form is similar to that of FIG. 11, except there is only one correlator 1101 and one gating function 1103. The Viterbi processor has previous states associated with $\{b_p(n_0-1), b_p(n_0)\}$. The current states would be all possibilities of $\{b_p(n_0), b_p(n_0+1)\}$. Thus, a transition from a previous state to a current state corresponds to a hypothesis $\{b_p(n_0-1), b_p(n_0), b_p(n_0+1)\}$. The delta metric is given by $$J'_h(n_0) = \sum_{m_0} 2\, Re\, [Q_{r,x_p}(n_0 N + m_0)\, U^*_{p,h}(n_0,m_0)] - |U_{p,h}(n_0,m_0)|^2$$

where $$U_{p,h}(n_0,m_0) = \sum_{n=n_0-1}^{n_0+1} b_{p,h}(n)\, S_{p,p}(n_0,n,m_0)$$

$$S_{p,p}(n_0,n,m_0) = \sum_m C_{x_p,x_p}(m - m_0 + (n - n_0)N)\, c_p(m)$$

Finally, by using both the first and second approximation together, a third approximation is obtained. This is a single signal detector for signal p which ignores ISI. In this case, measurements taken for the n'th transmitted symbol can be used directly to determine the n'th symbol period bit values; no Viterbi trellis is necessary. For each bit hypothesis at symbol period $n_0$, the detected bits are those which maximize the following metric:

$$J'_h(n_0) = \sum_{m_0} 2\, Re\, [Q_{r,x_p}(n_0 N + m_0)\, U^*_{p,h}(n_0,m_0)] - |U_{p,h}(n_0,m_0)|^2$$

where $$U_{p,h}(n_0,m_0) = b_{p,h}(n_0)\, S_{p,p}(n_0,n_0,m_0)$$

$$S_{p,p}(n_0,n_0,m_0) = \sum_m C_{x_p,x_p}(m - m_0)\, c_i(m)$$

The structure is the same as in FIG. 11, only now the Viterbi processor is replaced by a metric processor and there is only one correlator 1101 and one gating function 1102.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A receiver for demodulating at least one CDMA signal from a received signal comprising:

means for producing data samples from said received signal, means for collecting said data samples into blocks of complex data samples, means for aperiodically correlating said blocks of data samples with shifts of at least one known signature sequence, means for selecting a predetermined number of said aperiodic correlations, means for estimating multipath channel tap coefficients, means for forming real parts of products of said selected aperiodic correlations with said multipath channel tap coefficients, and means for combining said real parts of said products to determine at least one transmitted information symbol sequence.

2. The receiver of claim 1, wherein said means for estimating further comprises:

means for tracking time variations of said multipath channel tap coefficients.

3. The receiver of claim 1, wherein said means for combining uses a Viterbi algorithm to determine said at least one transmitted information symbol sequence.

4. The receiver of claim 1, wherein said received signal comprises a plurality of CDMA signals which are jointly demodulated to determine a plurality of transmitted information symbol sequences.

5. A receiver for jointly demodulating a plurality of CDMA signals from a received signal comprising:

means for producing data samples from said received signal, means for forming correlations of said data samples with at least one known signature sequence, means for selecting a predetermined number of said correlations, means for estimating multipath channel tap coefficients, means for forming real parts of products of said selected correlations with said multipath channel tap coefficients, and means for combining said products in a metric processor to determine transmitted information symbol sequences.

6. The receiver of claim 5, wherein said estimating means further comprises:

means for tracking time variations of said multipath channel tap coefficients.

7. A method for demodulating at least one CDMA signal from a received signal comprising the steps of:

producing data samples from said received signal, collecting said data samples into blocks of complex data samples, aperiodically correlating said blocks of data samples with shifts of at least one known signature sequence, selecting a predetermined number of said aperiodic correlations, estimating multipath channel tap coefficients, forming real parts of products of said selected aperiodic correlations with said multipath channel tap coefficients, and combining said real parts of said products to determine at least one transmitted information symbol sequence.

8. The method of claim 7, wherein said step of estimating further comprises the step of:

tracking time variations of said multipath channel tap coefficients.

9. The method of claim 7, wherein said step of combining further comprises the step of:

using a Viterbi algorithm to determine said at least one transmitted information symbol sequence.

10. A receiver for demodulating at least one CDMA signal from a received signal comprising:

means for producing data samples from said received signal, means for correlating said data samples to at least one known signature sequence to produce a plurality of correlations for each signature sequence, means for selecting one of said plurality of said correlations for each signal ray of each of said at least one CDMA signals, means for estimating multipath channel tap coefficients, and means for decorrelating said at least one CDMA signal using said selected correlations and said channel tap coefficients to solve for at least one transmitted information symbol sequence.

11. The receiver of claim 10, wherein said means for decorrelating uses only correlations corresponding to one symbol period of said at least one CDMA signal.

12. A method for demodulating at least one CDMA signal comprising the steps of:

producing data samples from said at least one CDMA signal, correlating said data samples to at least one known signature sequence to produce a plurality of correlations for each signature sequence, selecting one of said plurality of said correlations for each signal ray of each of said at least one CDMA signals, estimating multipath channel tap coefficients, and decorrelating said at least one CDMA signal using said selected correlations and said channel tap coefficients to solve for at least one transmitted information symbol sequence.

13. The method of claim 12, wherein said step of decorrelating uses only correlations corresponding to one symbol period of said at least one CDMA signal.

14. The receiver of claim 10, wherein said received signal comprises a plurality of CDMA signals which are jointly demodulated to determine a plurality of transmitted information symbol sequences.

15. The method of claim 12, wherein said received signal comprises a plurality of CDMA signals and said step of decorrelating solves for a plurality of transmitted information symbol sequences.

16. The receiver of claim 10, wherein said means for decorrelating further comprises means for noise whitening.

17. A receiver for demodulating at least one CDMA signal in a multipath environment comprising:

means for producing data samples from a received signal, means for correlating said data samples to at least one known signature sequence to produce a plurality of correlations for each signature sequence, means for selecting one of said plurality of said correlations for each signal ray of each of said at least one CDMA signals, means for estimating multipath channel tap coefficients, and means for deciding at least one transmitted information symbol sequence using a Viterbi processor, said selected correlation values and said channel tap coefficients.

18. The receiver of claim 17, wherein said means for deciding the information symbol sequences uses only correlations corresponding to a single symbol period of the at least one CDMA signal.

19. The receiver of claim 17, wherein said means for estimating further comprises:

means for tracking time variations in said multipath channel tap coefficients.

20. A method for demodulating at least one CDMA signal comprising the steps of:

producing data samples from a received signal, correlating said data samples to at least one known signature sequence to produce a plurality of correlations for each signature sequence, selecting one of said plurality of said correlations for each signal ray of each of said at least one CDMA signals, estimating multipath channel tap coefficients, and deciding at least one transmitted information symbol sequence using a Viterbi processor, said selected correlation values and said channel tap coefficients.

21. The method of claim 20, wherein said step of deciding the information bit sequences further comprises the step of:

using only correlations corresponding to a single symbol period of said at least one CDMA signal.

22. The method of claim 20, wherein said step of estimating further comprises the step of:

tracking time variations in said multipath channel tap coefficients.

23. A receiver for demodulating at least one CDMA signal from a received signal comprising:

means for producing data samples from said received signal, means for collecting said data samples into blocks of complex data samples, means for estimating multipath channel tap coefficients, means for forming a plurality of blocks of predicted received data samples using said channel tap coefficients, means for summing a magnitude square of a difference between said block of received data samples and said blocks of predicted received values to form a plurality of block metrics, and means for combining said block metrics to determine at least one transmitted information data sequence.

* * * * *